Patented July 7, 1942

2,289,194

UNITED STATES PATENT OFFICE 2,289,194

PROCESS OF MAKING HISTAMINASE PREPARATIONS

William Hiemenz, Albany, and Paul Setz, Elsmere, N. Y., assignors to Winthrop Chemical Company, Inc., New York, N. Y., a corporation of New York No Drawing. Application December 5, 1939, Serial No. 307,590

6 Claims. (Cl. 195—66)

This invention relates to a stable histaminase preparation and to a process of making it.

It is known that certain organs, such as the intestinal mucous membrane and the kidneys, contain a depoisoning agent which counteracts the poisons produced in the intestinal canal by bacterial and other cleavage processes. Toxic action has been found to be due to the presence of histamine, and histaminase is believed to be responsible for the depoisoning effect by inactivation of the histamine. The histaminase-containing extracts from the organs, however, are known to become ineffective quite rapidly owing to bacterial and other decompositions and have therefore always been the subject of attempts to improve their stability.

A histamine-destroying enzyme was observed in liver tissue of the common turkey buzzard. Active histaminase preparations were prepared by de-fatting and desiccating finely minced kidneys. These preparations are fairly stable when stored at refrigerator temperature, but lose their activity at room temperature and even quicker when kept at incubator temperature of 37° C.

Extensive studies on the stability of histaminase preparations from kidney have shown that two factors seem mainly responsible for the inactivation of histaminase preparations, namely moisture and oxygen, and that the enzymatic potency of histaminase can be preserved even at higher temperatures if oxygen be excluded. It has also been shown that under normal atmospheric conditions products with a higher percentage of moisture are less stable than those with a lower percentage.

Ever since the high value of histaminase preparations in treating certain allergic conditions which are caused by the poisonous effect of histaminase was established, many efforts have been made to prepare stable active histaminase preparations which could be brought into suitably dispensable form without loss of activity during the process of manufacture or on storage under normal atmospheric conditions. However, all attempts to produce a histaminase preparation from kidneys or intestinal mucous membrane in a suitable form, such as tablets or capsules, without loss in enzyme activity, so far have not been successful. A marked loss in activity was always noted during processing which tended to increase on storage at room temperature and under the average conditions of humidity. Physical mixtures of these histaminase preparations with substances, such as carbohydrates, namely sugar and the like, to prevent the injurious effect of the oxygen of the air did not improve the stability of the preparation.

The present invention provides a stable histaminase preparation which can be brought into a suitably dispensable form and stored as such under normal atmospheric conditions without loss of enzymatic potency. We have found that a stable histaminase preparation is obtained by de-fatting and desiccating finely minced fresh kidneys in the presence of a substance of the type already referred to, with water-miscible organic solvents, such as acetone. The organic substance is added to the initial material prior to purification in the usual manner. The histaminase preparations obtained by this method contain the stabilizing substance in such a combination with the dried tissue as to prevent any loss of activity due to the influence of the oxygen of the air. We have also found that products obtained according to the present process are less susceptible to the influence of moisture.

The invention is further illustrated by the following examples, but is not restricted thereto:

Example 1

10 lbs. of fresh hog kidneys are finely minced in a meat hasher. 1000 grams of cane sugar are added to the hash. This mixture is then introduced into 15 liters of acetone and stirred for 30 minutes. The precipitate is allowed to settle and the supernatant liquid is decanted. The residue is treated twice more in the same manner with 7.5 liters of acetone each. The residue is then extracted twice with 5 liters of ether, the ether being suctioned off after each extraction. The residue is dried at 25° C. in vacuo.

Yield: 1.3 kg. histaminase preparation. One histaminase unit is contained in 15 to 20 mg.

Example 2

10 lbs. of fresh hog kidneys are finely minced in a meat hasher. 1000 grams of glucose are added to the hash. This mixture is then introduced into 15 liters of acetone and stirred for 30 minutes. The precipitate is allowed to settle and the supernatant liquid is decanted. The residue is treated twice more in the same manner with 7.5 liters of acetone each. The residue is then extracted twice with 5 liters of ether, the ether being suctioned off after each extraction. The residue is dried at 25° C. in vacuo.

Yield: 1.3 kg. histaminase preparation. One histaminase unit is contained in 15 to 20 mg.

*Example 3*

5 lbs. of fresh hog intestinal mucous membrane are finely minced in a meat hasher. 550 grams of cane sugar are added to the hash. This mixture is then introduced into 8 liters of acetone and stirred for 30 minutes. The precipitate is allowed to settle and the supernatant liquid is decanted. The residue is treated twice more in the same manner with 4 liters of acetone each. The residue is then extracted twice with 3 liters of ether, the ether being suctioned off after each extraction. The residue is dried at 25° C. in vacuo.

Yield: 500 grams histaminase preparation. One histaminase unit is contained in 20 to 30 mg.

What we claim is:

1. A process of preparing a stable histaminase preparation from hog kidneys which comprises admixing the finely minced kidneys with cane sugar, introducing the mixture into acetone and stirring it, allowing it to settle and separating the precipitate formed from the supernatant liquid, rapidly extracting the precipitate first with acetone and then with ether, and drying the residue in vacuo.

2. A process of preparing a stable histaminase preparation from hog kidneys which comprises admixing the finely minced kidneys with glucose, introducing the mixture into acetone and stirring it, allowing it to settle and separating the precipitate from the supernatant liquid, rapidly extracting the precipitate first with acetone and then with ether, and drying the residue in vacuo.

3. A process of preparing a stable histaminase preparation from hog intestinal mucous membrane which comprises admixing the mucous membrane with cane sugar, introducing the mixture into acetone and stirring it, allowing it to settle and separating the precipitate formed from the supernatant liquid, rapidly extracting the precipitate first with acetone and then with ether, and drying the residue in vacuo.

4. A process of preparing a stable histaminase preparation from animal kidneys which comprises admixing the finely minced kidneys with a sugar, introducing the mixture into a water-soluble, low molecular weight aliphatic ketone, while stirring, allowing the mixture to settle, separating the precipitate formed from the supernatant liquid, rapidly extracting the precipitate first with said ketone and then with a water-immiscible low molecular aliphatic ether and drying the residue.

5. The process as defined in claim 4, wherein the animal kidneys are hog kidneys.

6. A process of preparing a stable histaminase preparation from hog kidneys which comprises admixing the finely minced kidneys with a sugar, introducing the mixture into acetone, while stirring, allowing the mixture to settle and separating the precipitate formed from the supernatant liquid, rapidly extracting the precipitate first with acetone and then with ether and drying the residue in vacuo.

WILLIAM HIEMENZ.
PAUL SETZ.